United States Patent
Karna et al.

(10) Patent No.: US 11,620,918 B2
(45) Date of Patent: Apr. 4, 2023

(54) DELIVERING PERSONALIZED LEARNING MATERIAL

(71) Applicant: INTERNATIONAL BUSINESS MACHINES CORPORATION, Armonk, NY (US)

(72) Inventors: Geetha Karna, Bengaluru (IN); Danish Contractor, Haryana (IN); Sreekanth Kakaraparthy Lakshmi, Bangalore (IN); Kuntal Dey, Vasant Kunj (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1029 days.

(21) Appl. No.: 16/285,816

(22) Filed: Feb. 26, 2019

(65) Prior Publication Data
US 2020/0273361 A1 Aug. 27, 2020

(51) Int. Cl.
*G09B 5/12* (2006.01)
*G09B 17/00* (2006.01)
*G06F 3/01* (2006.01)
*G06V 40/16* (2022.01)

(52) U.S. Cl.
CPC ............... *G09B 5/12* (2013.01); *G06F 3/013* (2013.01); *G06V 40/174* (2022.01); *G09B 17/003* (2013.01)

(58) Field of Classification Search
None
See application file for complete search history.

(56) References Cited

U.S. PATENT DOCUMENTS

| | | | |
|---|---|---|---|
| 8,500,450 B1 * | 8/2013 | Taylor | G09B 7/04 434/179 |
| 8,577,280 B2 | 11/2013 | Hutchinson et al. | |
| 11,024,194 B1 * | 6/2021 | Beigman Klebanov | G09B 17/04 |
| 2006/0228692 A1 | 10/2006 | Seshadri | |
| 2007/0011005 A1 * | 1/2007 | Morrison | G09B 5/06 704/231 |
| 2007/0172810 A1 * | 7/2007 | McCallum | G09B 7/04 434/169 |

(Continued)

FOREIGN PATENT DOCUMENTS

| | | |
|---|---|---|
| CN | 105615294 A | 6/2016 |
| WO | 2017199552 | 11/2017 |

OTHER PUBLICATIONS

Mell et al., "The NIST Definition of Cloud Computing", NIST, Special Publication 800-145, Sep. 2011, 7 pages.

*Primary Examiner* — Justin S Lee
(74) *Attorney, Agent, or Firm* — Joseph P. Curcuru; Andrew D. Wright; Calderon, Safran & Cole, P.C.

(57) ABSTRACT

Methods and systems for delivering personalized learning material are disclosed. A method includes providing, by a computer device, current learning material and advance learning material to a plurality of students; monitoring, by the computer device, a reading performance and a complexity of the advance learning material for a student of the plurality of students; determining, by the computer device, a student comprehension score for the student based on the monitoring the reading performance and the complexity of the advance learning material; and providing, by the computer device, additional learning material to the student based on the student comprehension score being above a threshold.

20 Claims, 6 Drawing Sheets

(56) References Cited

U.S. PATENT DOCUMENTS

| | | | |
|---|---|---|---|
| 2009/0280460 A1 | 11/2009 | Yaskin | |
| 2010/0003659 A1* | 1/2010 | Edmonds | G09B 7/04 |
| | | | 434/350 |
| 2010/0092931 A1* | 4/2010 | McCallum | G09B 17/00 |
| | | | 434/178 |
| 2011/0076654 A1* | 3/2011 | Green | G09B 7/04 |
| | | | 434/169 |
| 2012/0054672 A1* | 3/2012 | McDowell | G09B 17/003 |
| | | | 715/803 |
| 2013/0295535 A1* | 11/2013 | Levy | G09B 17/006 |
| | | | 434/169 |
| 2014/0272907 A1 | 9/2014 | Raniere | |
| 2016/0027321 A1* | 1/2016 | Taylor | G09B 17/02 |
| | | | 434/180 |
| 2016/0035237 A1 | 2/2016 | Nealon et al. | |
| 2016/0111011 A1* | 4/2016 | Severino | G09B 17/006 |
| | | | 434/178 |
| 2016/0358488 A1 | 12/2016 | Canter et al. | |
| 2017/0256176 A1* | 9/2017 | Offutt | G09B 7/08 |
| 2018/0096625 A1* | 4/2018 | Kochura | G09B 17/003 |
| 2018/0096626 A1* | 4/2018 | Kochura | G09B 7/02 |
| 2018/0286272 A1* | 10/2018 | McDermott | A61B 5/375 |
| 2019/0066525 A1* | 2/2019 | Palau | G09B 5/00 |
| 2019/0096277 A1* | 3/2019 | Lu | G09B 17/00 |

\* cited by examiner

DELIVERING PERSONALIZED LEARNING MATERIAL

BACKGROUND

The present invention relates generally to improving learning efficiency and, more particularly, to providing tailored learning material based on each student's comprehension level.

Typical learning models for large-scale education, such as classrooms, involve a teacher or instructor providing learning material to a large number of students. Accordingly, each student receives about the same amount of learning material. Personalizing learning material, as well as personalizing learning pathways, allows a student to maximize their learning potential in line with their individual proficiency.

SUMMARY

In a first aspect of the invention, there is a computer-implemented method comprising providing, by a computer device, current learning material and advance learning material to a plurality of students; monitoring, by the computer device, a reading performance and a complexity of the advance learning material for a student of the plurality of students; determining, by the computer device, a student comprehension score for the student based on the monitoring the reading performance and the complexity of the advance learning material; and providing, by the computer device, additional learning material to the student based on the student comprehension score being above a threshold.

In another aspect of the invention, there is a computer program product including a computer readable storage medium having program instructions embodied therewith. The program instructions are executable by a computing device to cause the computing device to provide current learning material and advance learning material to a plurality of students; monitor a reading performance and a complexity of the advance learning material for a student of the plurality of students; determine a student comprehension score for the student based on the monitoring the reading performance and the complexity of the advance learning material; and provide additional learning material to the student based on the student comprehension score being above a threshold, wherein the current learning material, the advance learning material and the additional learning material is part of a same curriculum.

In another aspect of the invention, there is system including a processor, a computer readable memory, and a computer readable storage medium. The system includes program instructions to provide current learning material and advance learning material to a plurality of students; program instructions to monitor a reading performance and a complexity of the advance learning material for a student of the plurality of students; program instructions to determine a student comprehension score for the student based on the monitoring the reading performance and the complexity of the advance learning material; and program instructions to provide additional learning material to the student based on the student comprehension score being above a threshold, wherein a difficulty level of the additional learning material is based on the student comprehension score. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to improving learning efficiency and, more particularly, to providing tailored learning material based on each student's comprehension level. In this manner, implementations of the invention allow a given student to maximize their learning potential in line with their individual proficiency by receiving personalized learning material and benefiting from personalized learning pathways.

Personalization of content, including education material, allows a student to not only receive personalized learning material for a given class, but also to receive the next set of personalized materials for the next learning session or next set of learning sessions, in order to guide and expand the student's overall long-term learning. In a large classroom, personalizing the learning material may be difficult because every student may have a different proficiency and understanding level and capacity, and the delivery of the learning material typically takes place in a distribution setting such as a black/white board, lecture material projection, instructor's verbal delivery, and the like. Thus, in such a large scale distribution setting, where all students of varying proficiency levels must cover the same learning material during the same period of time, it may be difficult to expose higher proficiency students to personalized advance learning material.

In embodiments, the students that are part of a class have access to all or a portion of the learning material for the entire course, the learning material including material that is currently being taught in the class, herein referred to as "current learning material," as well as learning material that is to be taught in subsequent classes, herein referred to as "advance learning material," or other advanced learning material. Accordingly, each student has the ability to read advance learning material in advance of the class. In embodiments, the system monitors the amount of advance learning material that is read by a given student prior to the advance learning material being taught in class, referred to herein as pre-read material. For example, the system monitors the amount of time that each student has spent reading the pre-read material, the portions of the pre-read material that have actually been read, the portions of the pre-read material that have been skipped, the success rate of the student in answering questions or solving problems associated with the pre-read material, and the like. As a result of the monitoring, the system determines a student comprehension score of the pre-read material for each student, the student comprehension score taking into account the complexity of the pre-read material and the reading performance of the pre-read material by the student. In embodiments, if a given student has not read any of the advance learning material, then there is no pre-read material for that student and the student comprehension score for that student is zero.

In embodiments, during class, the instructor of the class provides the current learning material, i.e., the learning material to be taught during the current class, to all the students of the class. In embodiments, the instructor provides the current learning material to the reading device of each student via, for example, a network. In embodiments, the reading device of each student is a digital tablet, a smart phone, a computer, and the like. In embodiments, the instructor also provides advance learning material to the students of the class, for example via the network. Alternatively, in embodiments, the students can access the advance learning material from a learning material database. In embodiments, if the student comprehension score of the student for the advance learning material is above a given threshold, then the instructor sends an additional amount of learning material to that student. Alternatively, if the student comprehension score of the student for the advance learning material is above a given threshold, then the student is able to access the additional amount of learning material from the learning material database. In embodiments, if a student has not read any advance learning material in advance of the class, or if the student comprehension score of the student for the advance learning material is below the threshold, then the instructor does not send any additional amount of learning material to that student. Accordingly, any student that has obtained a good understanding of the advance learning material ahead of class, as evidenced by the student comprehension score being above the given threshold, is given an opportunity to continue to expand their knowledge of the class material by receiving or accessing additional learning material. As a result, the amount of learning material provided to each student can be modulated in proportion to each student's ability to read and comprehend the learning material of that class.

Embodiments of the invention improve the technology of education by providing students with personalized learning material in proportion to each students' ability. Embodiments of the invention employ an unconventional arrangement of steps including: providing, by a computer device, current learning material and advance learning material to a plurality of students; monitoring, by the computer device, a reading performance and a complexity of the advance learning material for a student of the plurality of students; determining, by the computer device, a student comprehension score for the student based on the monitoring the reading performance and the complexity of the advance learning material; and providing, by the computer device, additional learning material to the student based on the student comprehension score being above a threshold The steps themselves are unconventional, and the combination of the steps is also unconventional. For example, the step of determining, by the computer device, a student comprehension score for the student based on the monitoring the reading performance and the complexity of the advance learning material creates new information that does not exist in the system, and this new information is then used in subsequent steps in an unconventional manner, namely to provide, by the computer device, additional learning material to the student based on the student comprehension score being above a threshold. Embodiments of the invention also utilize elements and/or techniques that are necessarily rooted in computer technology, including a cognitive algorithm relying on lexical, syntactic and semantic patterns. Embodiments improve the functioning of a computer combination, in this case a server and a client device, and more specifically includes aspects that are directed to a specific improvement of the operation of the mobile device when use in communication between users, and thus are directed to a specific implementation of a solution to a problem in large scale education.

Embodiments of the invention relate to a system and associated methods to increase the knowledge horizon of students by providing them personalized learning (i.e., advance learning material) in a classroom setting. Specifically, the methods are driven by advance reading attempts of the learning material currently being taught in the classroom by at least one student, and the success of such advance reading attempts by the at least one student. The advance learning material is typically delivered to the students' personal electronic devices, such as tablet/laptop computers that they are currently using in the classroom to expand their education in addition to the learning material taught in a live setting by the instructor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
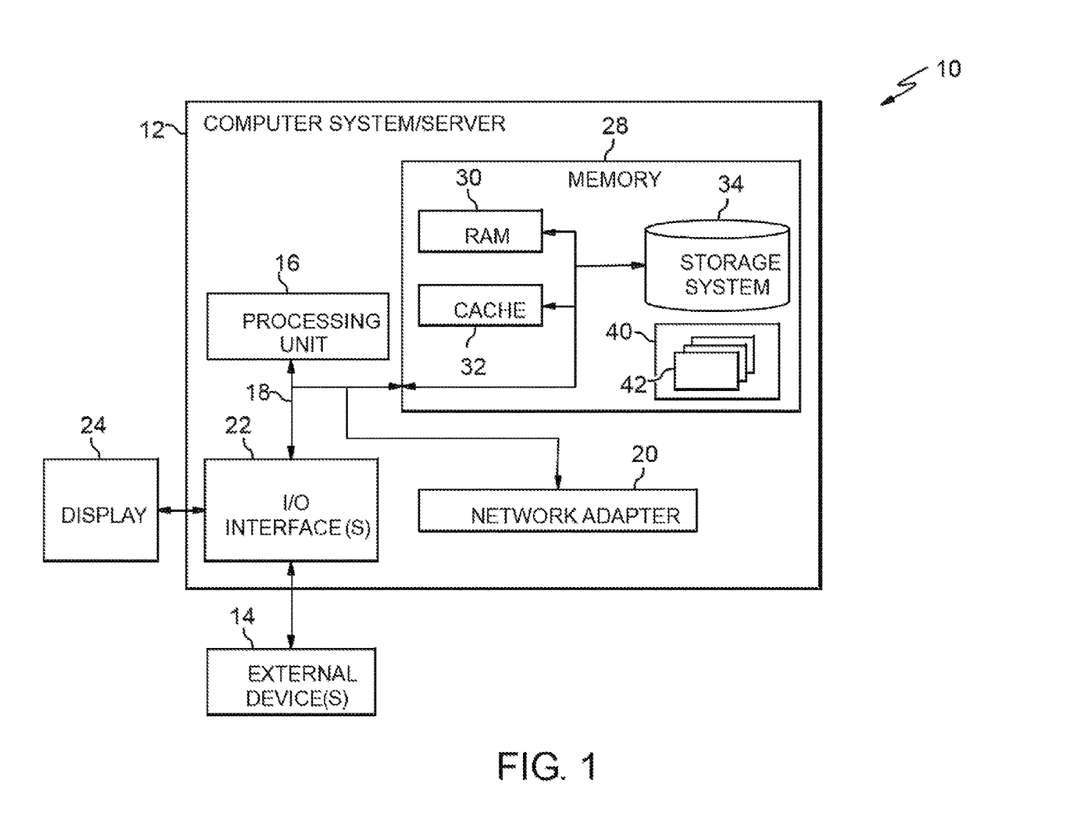
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
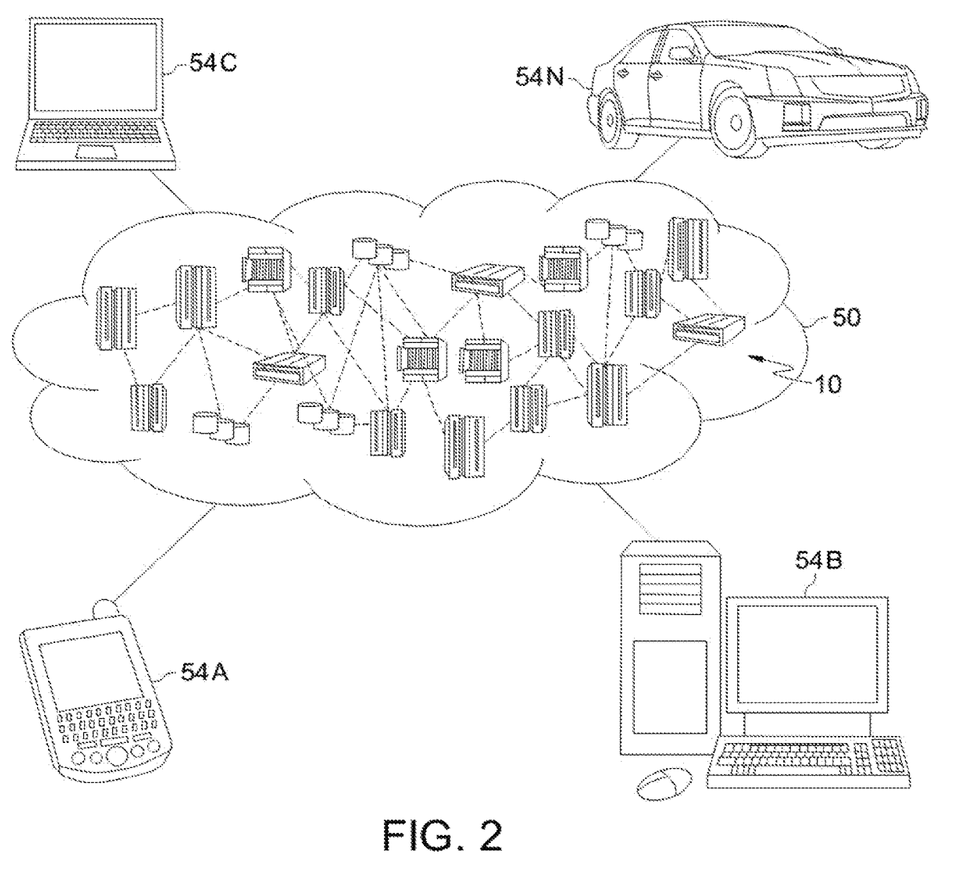
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
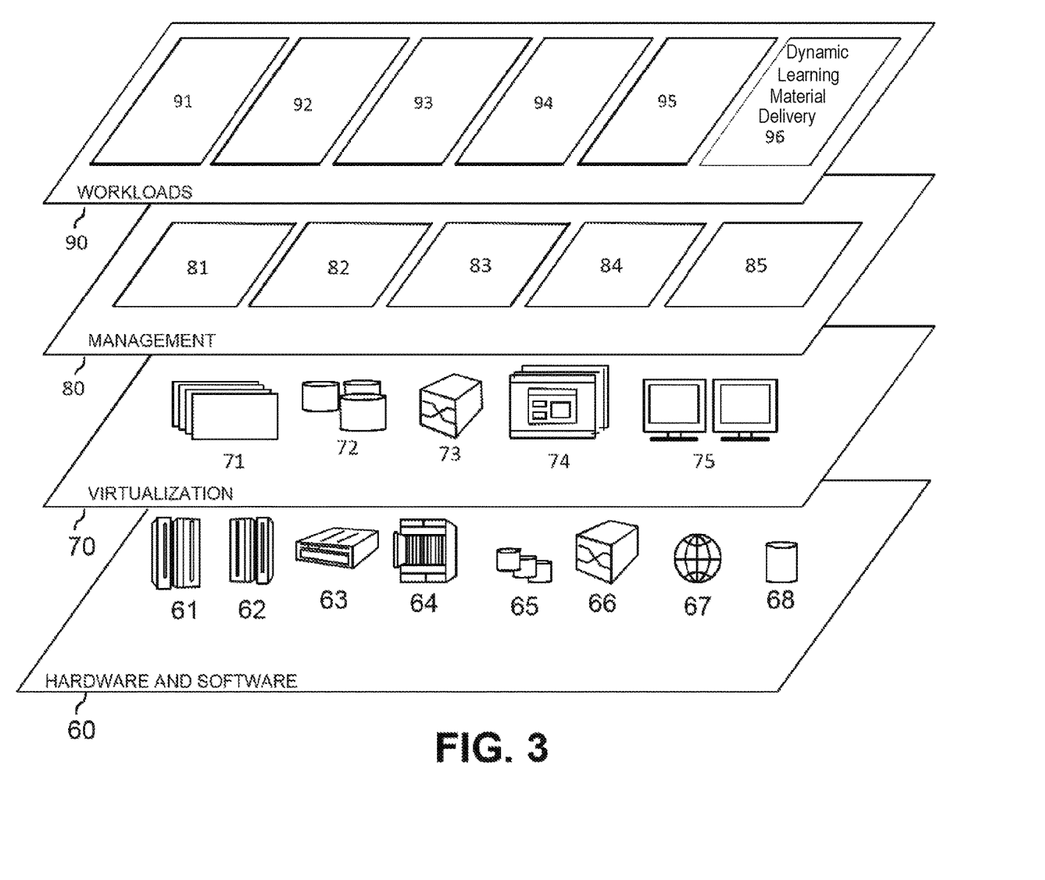
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic learning material delivery 96.

Implementations of the invention may include a computer system/server 12 of FIG. 1 in which one or more of the program modules 42 are configured to perform (or cause the computer system/server 12 to perform) one or more functions of the dynamic learning material delivery 96 of FIG. 3. For example, the one or more of the program modules 42 may be configured to: provide current learning material and advance learning material to a plurality of students; monitor a reading performance and a complexity of the advance learning material for a student of the plurality of students; determine a student comprehension score for the student based on the monitoring the reading performance and the complexity of the advance learning material; and provide additional learning material to the student based on the student comprehension score being above a threshold, wherein the current learning material, the advance learning material and the additional learning material is part of a same curriculum.

Figure 4:
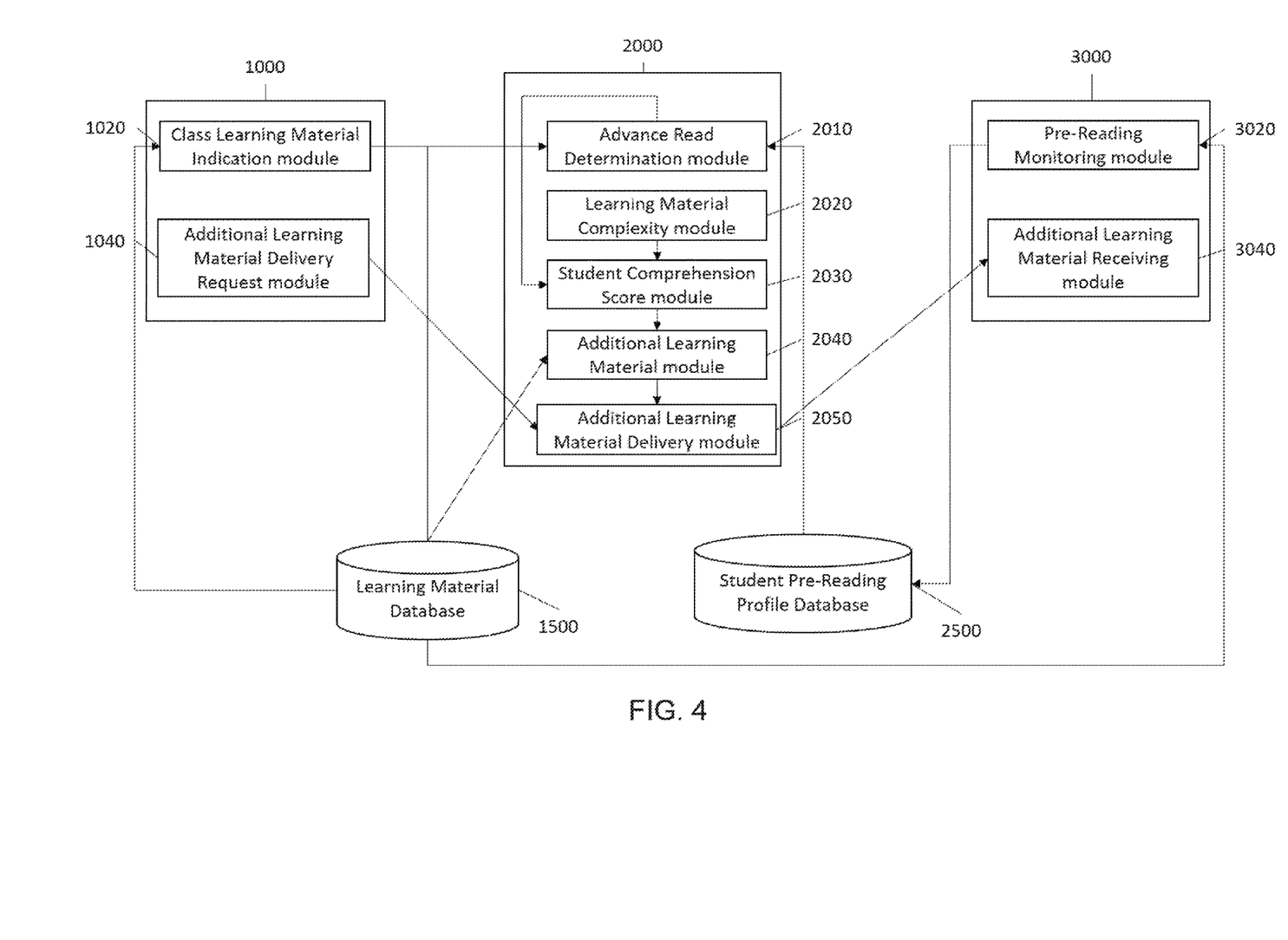
FIG. 4 shows a block diagram of an exemplary environment in accordance with aspects of the invention.

FIG. 4 shows a block diagram of an exemplary environment in accordance with aspects of the invention. In embodiments, the environment includes an instructor device 1000, a server 2000, and a student device 3000. In embodiments, the instructor device 1000 includes a Class Learning Material Indication module 1020 that provides an indication to deliver learning material to all the students of a class, and an Additional Learning Material Delivery Request module 1040 that provides a request to deliver additional learning material to some or all of the students of the class. In embodiments, the instructor device 1000 is a local computing device such as, for example, the personal digital assistant (PDA) or cellular telephone 54A, the desktop computer 54B, and/or the laptop computer 54C illustrated in FIG. 2. In embodiments, the Class Learning Material Indication module 1020 and the Additional Learning Material Delivery Request module 1040 each include one or more program modules such as program modules 42 described with respect to FIG. 1.

In embodiments, the server 2000 is operatively coupled to the instructor device 1000, and includes an Advance Read Determination module 2010, a Learning Material Complexity module 2020, a Student Comprehension Score module 2030, an Additional Learning Material module 2040, and an Additional Learning Material Delivery module 2050. In embodiments, the server 2000 includes one or more computer systems/servers 12 illustrated in FIG. 1. In embodiments, the modules 2010, 2020, 2030, 2040 and 2050 each include one or more program modules such as the program module 42 described with respect to FIG. 1.

In embodiments, a student device 3000 is operatively coupled to the server 2000, and is a laptop computer, tablet computer, and the like. In embodiments, the student device 3000 includes a Pre-Reading Monitoring module 3020 and an Additional Learning Material Receiving module 3040. In embodiments, the student device 3000 includes one or more computer systems/servers 12 illustrated in FIG. 1. In embodiments, the modules 3020 and 3040 each include one or more program modules such as the program module 42 described with respect to FIG. 1.

In embodiments, the instructor device 1000 and the server 2000 are coupled to a Learning Material Database 1500, which stores the entirety of the learning material to be provided to the students for the entire curriculum, or for the learning cycle such as a semester. In embodiments, the server 2000 and the student device 3000 are coupled to a Student Pre-Reading Database 2500 which stores any learning material that has been read in advance of class by each student in memory. Alternatively, in embodiments, the Student Pre-Reading Database 2500 includes an indication of the learning material that has been read in advance of class by each student, the learning material being accessible by the student device 3000 from the Learning Material Database 1500. In embodiments, the Learning Material Database 1500 and the Student Pre-Reading Database 2500 include one or more computer systems/servers such as the computer system/server 12 illustrated in FIG. 1.

In operation of embodiments, for each student, prior to or during a class, the students receive learning material from the Learning Material Database 1500 at the student device 3000 via the instructor device 1000. Alternatively, in embodiments, each of the instructor and the students have access to the learning material at the Learning Material Database 1500. In embodiments, the learning material encompasses the learning material for an upcoming class as well as the learning material for the entire curriculum or learning cycle. For example, in embodiments, the learning material encompasses the entire learning material for the semester. In embodiments, if a student has read class material on their student reading device 3000 prior to class, referred to herein as advance learning material, then while the student reads the advance learning material, the Pre-Reading Monitoring module 3020 monitors in real time the portion of the advance learning material that the student is reading. In embodiments, the system monitors the amount of advance learning material that is read by a given student prior to the advance learning material being taught in class. In embodiments, the Pre-Reading Monitoring module 3020 determines information about the advance learning material that has been read by each student prior to class. For example, the information includes the amount of time spent by the student in reading the advance learning material, the number of attempts by the student at solving the exercises or answering the questions that are part of the advance learning material, the success rate of the student in solving the exercises and answering the questions, the amount of the advance learning material that has been read, the amount of advance learning material that has been skipped over by the student during reading, tracking the eye gaze of the student during reading of the advance learning material, and monitoring the facial expression of the student during reading of the advance learning material. In embodiments, tracking the eye gaze includes monitoring the fixation of the eye gaze or any regression of the eye gaze during reading. In embodiments, tracking the eye gaze includes recording the eye gaze via a visual recording device coupled to the student reading device 3000. In embodiments, the Pre-Reading Monitoring module 3020 monitors the eye gaze of the student during the reading of the advance learning material and determines the amount of time that the student has spent gazing at specific portions of the advance learning material, which portions of the advance learning material have been read more than once, and which portions have been skipped over. In embodiments, the Pre-Reading Monitoring module 3020 transmits the portion of the advance learning material that has been read by the student, referred to herein as pre-read material, as well as the information about the pre-read material, from the Learning Material Database 1500 to the Student Pre-Reading Database 2500. In embodiments, the Student Pre-Reading Database 2500 stores the pre-read material for each student, as well as the information about the pre-read material. Alternatively, in embodiments, the Student Pre-Reading Database 2500 stores an indication of the pre-read material stored in the Learning Material Database 1500, instead of the actual content of the pre-read material.

In embodiments, the Student Pre-Reading Database 2500 transmits, or alternatively indicates, the pre-read material for each student to the Advance Read Determination module 2010. In embodiments, when class starts, the instructor provides an indication of the current class material via the Class Learning Material Indication module 1020 at the instructor device 1000 to each student reading device 3000, and also to the Advance Read Determination module 2010 at the server 2000. As a result, the Advance Read Determination module 2010 compares the learning material indicated by the Class Learning Material Indication module 1020 and the pre-read material indicated or transmitted by the Student Pre-Reading Database 2500, and determines which portion of the pre-read material for each student is not part of the current class. As a result, the Advance Read Determination module 2010 determines an advance read learning material, hereinafter referred to as "Advance Read," as being the difference in content between the pre-read material and the current class material.

In embodiments, the Student Comprehension Score module 2030 generates a student comprehension score of the Advance Read for each student. In embodiments, the Student Comprehension Score module 2030 generates the student comprehension score of the Advance Read for each student by combining a reading performance score with a complexity score of the Advance Read.

In embodiments, the complexity score of the Advance Read is determined by the Learning Material Complexity module 2020. In embodiments, the Learning Material Complexity module 2020 determines the complexity of the Advance Read for each student, for example, by using a cognitive algorithm based on lexical, syntactic and semantic patterns in the Advance Read, or based on measuring eye movement patterns of the student when reading the Advance Read. In embodiments, an administrator provides an indication of the complexity, such as a complexity score, of the Advance Read. In embodiments, the Learning Material Complexity module 2020 determines a difficulty level of the Advance Read for each student as part of the complexity of the Advance Read.

In embodiments, the reading performance score of the Advance Read is determined by the Student Comprehension Score module 2030. In embodiments, the Student Comprehension Score module 2030 determines the reading performance score of the Advance Read by the student based on, for example, an amount of time spent by the student in reading the Advance Read, the number of attempts at solving the exercises or answering the questions that are part of the Advance Read, the success rate of the student in solving the exercises and answering the questions of the Advance Read, the amount of the Advance Read that has been read, and the amount of material of the Advance Read that has been skipped over by the student. In embodiments, the Student Comprehension Score module 2030 generates a student comprehension score as a function of the reading performance score and the reading complexity score of the Advance Read for each student. In embodiments, the Student Comprehension Score module 2030 uses an algorithm to derive the student comprehension score via a mathematical function of the reading performance score and the reading complexity score of the Advance Read for each student. In embodiments, the difficulty level of the Advance Read is based on the student comprehension score.

In embodiments, the Additional Learning Material module 2040 determines the amount of additional learning material to be provided to each student based on the student comprehension score determined by the Student Comprehension Score module 2030 for each student. In embodiments, the higher the student comprehension score of a given student, the larger or more complex is the additional learning material provided to the student. In embodiments, no amount of additional learning material is provided to a student if the student comprehension score of that student is below a given threshold. In embodiments, in response to the Additional Learning Material module 2040 determining that an amount of additional learning material is to be provided to a student, the Additional Learning Material module 2040 indicates which portion of the learning material stored in the Learning Material Database 1500 is to be provided to the student as additional learning material. In embodiments, the Additional Learning Material module 2040 determines an amount of additional learning material to provide to the student via an algorithm that takes into account the amount of pre-read material and the student comprehension score of the student. In embodiments, the Learning Material Database 1500 transmits the additional learning material to the Additional Learning Material module 2040, the additional learning material being specific to each student and based on each student's comprehension score.

In embodiments, in response to the teacher sending out a request via the Additional Learning Material Delivery Request module 1040 to the Additional Learning Material Delivery module 2050, and based on the additional learning material identified by the Additional Learning Material module 2040, the Additional Learning Material Delivery module 2050 receives the additional learning material for the student from the Additional Learning Material module 2040 and transmits the received additional learning material to the Additional Learning Material Receiving module 3040 at the student reading device 3000. Alternatively, in embodiments, in response to the teacher sending out a request by the Additional Learning Material Delivery Request module 1040 to the Additional Learning Material Delivery module 2050, and based on the additional learning material identified by the Additional Learning Material module 2040, the Additional Learning Material Delivery module 2050 transmits the additional learning material from the Learning Material Database 1500 to the Additional Learning Material Receiving module 3040 at the student reading device 3000. In embodiments, as a result of the additional learning material being transmitted from the Learning Material Database 1500 to the Additional Learning Material Receiving module 3040, the student has additional learning material that they can read and further increase their knowledge and understanding of the subject matter. In embodiments, in response to the student reading the received additional learning material, the Pre-Reading Monitoring module 3020 monitors in real time the received additional learning material, referred to herein as "New Advance Read," and transmits the New Advance Read, as well as information about the New Advance Read, to the Student Pre-Reading Database 2500. As a result, the various steps discussed above are performed anew.

Figure 5:
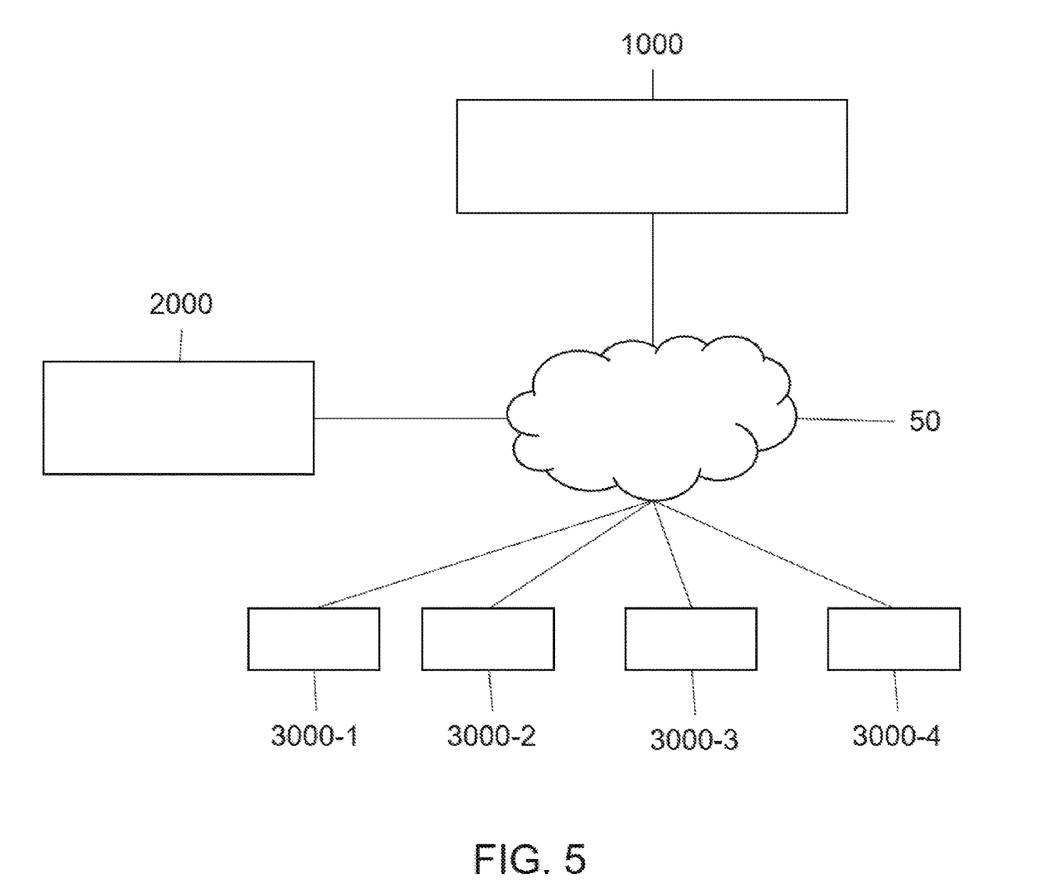
FIG. 5 shows a block diagram of an exemplary environment in accordance with aspects of the invention.

FIG. 5 shows a block diagram of an exemplary environment in accordance with aspects of the invention. In FIG. 5, the instructor device 1000 and the server 2000 illustrated in FIG. 4 are connected to a network such as the cloud computing environment 50 illustrated in FIG. 2. In embodiments, a plurality of student devices 3000-1, 3000-2, 3000-3 and 3000-4, each including a device such as the student device 3000 illustrated in FIG. 4, are also connected to the cloud computing environment 50. Accordingly, in embodiments, the instructor device 1000, the server 2000 and the plurality of student devices 3000-1, 3000-2, 3000-3 and 3000-4 are operatively coupled to each other via the cloud computing environment 50. In embodiments, although FIG. 4 illustrates four (4) student devices, there are more than four (4) student devices. For example, in a large class of thirty (30) students, there are thirty (30) student devices 3000. In embodiments, there are less than four (4) student devices.

Figure 6:
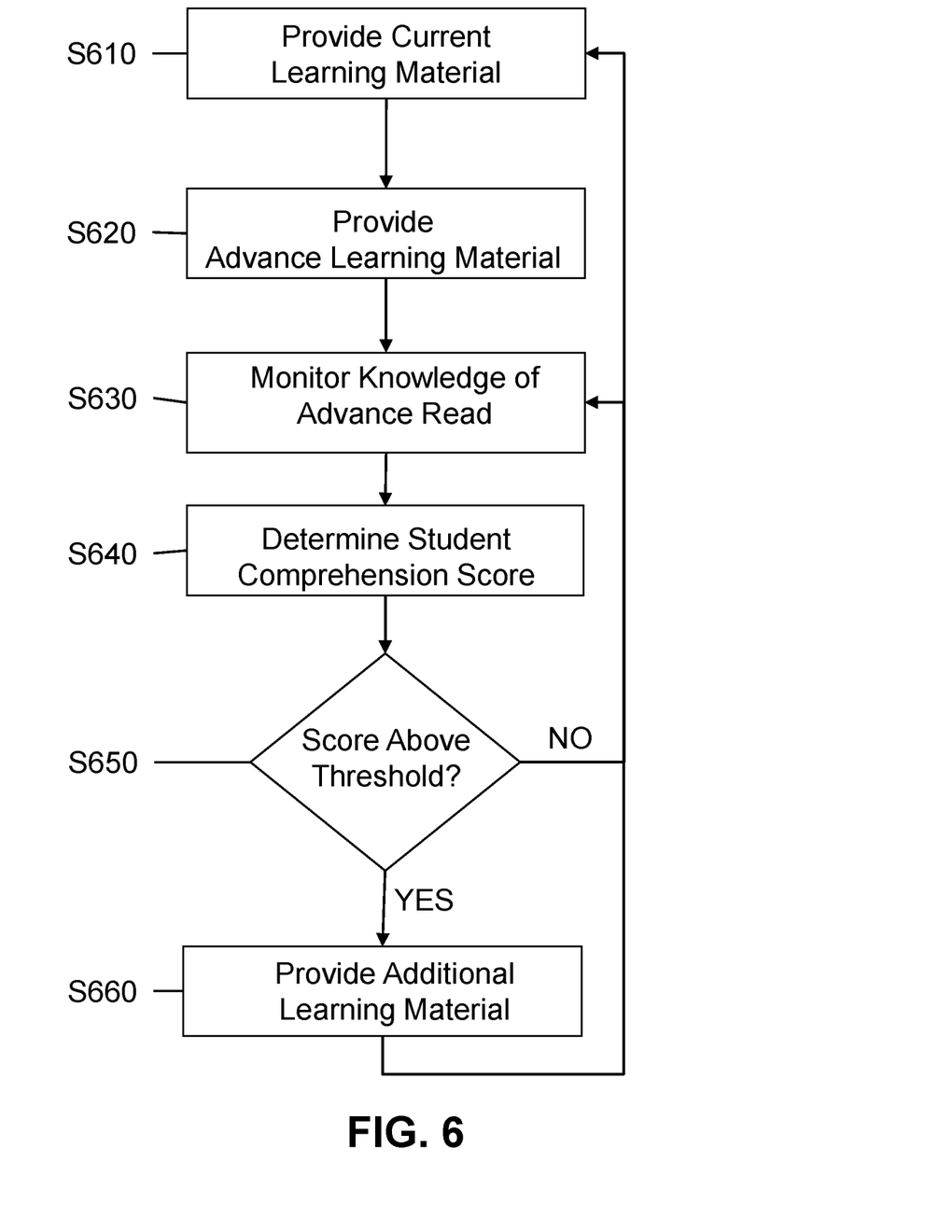
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

In embodiments, at step S610, the system provides current learning material to the students in a class. In embodiments, and as described with respect to FIG. 4, the system provides the current learning material from the Learning Material Database 1500 to the student devices 3000. In embodiments, at step S610, the system also provides the current learning material from the Learning Material Database 1500 to the Advance Read Determination module 2010.

In embodiments, at step S620, the system provides advance learning material to the students, or allows access to the advance learning material by the students. In embodiments, and as described with respect to FIG. 4, the system provides the advance learning material from the Learning Material Database 1500 to the student device 3000 via the Additional Learning Material Delivery module 2050 of the server 2000, or allows access to the Learning Material Database 1500 by the student device 3000.

In embodiments, at step S630, the system monitors in real time the portion of the advance learning material that each student is reading and determines information about the advance learning material that has been read by each student prior to class, referred to herein as the pre-read material. In embodiments, and as described with respect to FIG. 4, the system monitors in real time the portion of the advance learning material that each student is reading via the Pre-Reading Monitoring module 3020, and provides an indication of the pre-read material, or alternatively provides the contents of the pre-read material, to the Advance Read Determination module 2010 via the Student Pre-Reading Profile Database 2500.

In embodiments, at step S640, the system compares the learning material provided by the instructor (from step S610) and the pre-read material (from step S630) to generate an Advance Read. In embodiments, at step S640, the system determines a student comprehension score of the Advance Read for each student, the student comprehension score taking into account a reading performance score of the Advance Read and a complexity score of the Advance Read. In embodiments, and as described with respect to FIG. 4, the system determines the complexity of the Advance Read for each student via the Learning Material Complexity module 2020, and determines a student comprehension score of the Advance Read for each student at the Student Comprehension Score module 2030 by combining a reading performance score of the Advance Read with a complexity score of the Advance Read.

In embodiments, at step S650, the system determines whether the student comprehension score for each student is above a predefined threshold. In embodiments, and as described with respect to FIG. 4, the system determines whether the comprehension score for each student is above the given threshold at the server 2000.

In embodiments and for each student, in response to the student comprehension score that is determined at step S640 being below the given threshold, the system at step S610 continues to provide current learning material to the student, in pace with the rest of the students in the class. In embodiments, and as described with respect to FIG. 4, the system provides the current learning material from the Learning Material Database 1500 to the student devices 3000.

In embodiments and for each student, in response to the student comprehension score determined at step S640 being above the given threshold, the system at step S660 provides additional learning material to the student. In embodiments, and as described with respect to FIG. 4, in response to the teacher sending out a request by the Additional Learning Material Delivery Request module 1040 to the Additional Learning Material Delivery module 2050, and based on the additional learning material identified by the Additional Learning Material module 2040, the Additional Learning Material Delivery module 2050 transmits the additional learning material from the Learning Material Database 1500 to the Additional Learning Material Receiving module 3040. In embodiments, after providing the additional learning material to the student, the system at step S630 continues to monitor any new advance learning material for each student, the new advance learning material being learning material that has not yet been taught in class. In embodiments, and as described with respect to FIG. 4, the system monitors in real time any new learning material that each student is reading via the Pre-Reading Monitoring module 3020. In embodiments, the current learning material, the advance learning material and the additional learning material are part of a same curriculum. In embodiments, the advance learning material includes at least one selected from the group consisting of an advanced example and an extra credit question.

In embodiments, as an example, Alice, Bob and Charlie are classmates in the $8^{th}$ grade. In this example, Alice did not read any class material in advance ("advance material"), but Bob and Charlie have both read up on the topic of "blood," in varying amounts, before the topic is taught in biology class. In addition, Charlie spent more time than Bob reading the advance material, and a frontal camera on Charlie's reading device shows that Charlie's eyes move more smoothly over the advance material, and his facial expressions are more relaxed while reading the advance material than Bob's. As a result, Charlie's student comprehension score as defined above is the highest, Bob's student comprehension score is lower than Charlie's, and Alice's student comprehension score is the lowest. During class, when the teacher has covered some of the class learning material, the instructor sends personalized additional learning material to the students via her instructor device. Accordingly, the students receive the baseline material as well as personalized additional learning material. More specifically, because Alice did not read any class material in advance and has the lowest student comprehension score, she only receives a baseline learning material, which includes questions and suggested answers. Bob, who has a higher student comprehension score than Alice, not only receives the same material that Alice receives, but also receives additional learning material on the chemical composition of mainstream blood corpuscles. Charlie, who has a higher student comprehension score than both Alice and Bob, receives all the learning material that Bob receives, but also receives additional learning material on the details of how bone marrow physically can chemically synthesize blood. Accordingly, each of the students receives a varying amount of additional learning material, the amount of additional learning material being a function of the student comprehension score of each student.

It should be understood that, to the extent implementations of the invention collect, store, or employ personal information provided by, or obtained from, individuals (for example, the portion of the advance learning material that the student is reading monitored by the Pre-Reading Monitoring module 3020), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

providing, by a computer device, advance learning material to be taught at future learning events to a plurality of students;

for each of the plurality of students:

monitoring, by the computer device, a student's interactions with the advanced learning material prior to a first learning event based on data from a reading device of the student, including data from a visual recording device, to determine portions of the advanced learning material pre-read by the student;

determining, by the computer device, a reading performance of the student and a complexity of the portion of the advance learning material pre-read by the student based on the monitoring;

determining, by the computer device, a student comprehension score for the student based on the reading performance and the complexity of the portion of the advance learning material pre-read by the student prior to the first learning event; and determining, by the computing device, a difference in content between the portions of the advanced learning material pre-read by the student and current learning material of the advance learning material to be taught at the first learning event, the difference comprising available advanced learning material for the student;

providing, by the computer device during the first learning event, the current learning material to each of the plurality of students; and selectively providing to each respective student of the plurality of students, by the computer device during the first learning event, an amount of additional learning material from the available advanced learning material of the respective student to the reading device of the respective student based on the student comprehension score of the respective student.

2. The method of claim 1, wherein the current learning material, the advance learning material and the additional learning material are part of a same curriculum.

3. The method of claim 1, wherein the advance learning material comprises at least one selected from the group consisting of an advanced example and an extra credit question.

4. The method of claim 1, wherein the monitoring the student's interactions with the advance learning material comprises at least one selected from the group consisting of:

measuring an amount of time spent by the student in reading the advance learning material;

measuring a success rate in solving one or more exercises and answering one or more questions included with the advance learning material;

measuring an amount of the advance learning material that is read by the student;

measuring one or more portions of the advance learning material that is skipped by the student;

tracking an eye gaze of the student during reading of the advance learning material; and monitoring a facial expression of the student during reading of the advance learning material.

5. The method of claim 4, wherein the tracking the eye gaze comprises monitoring at least one of a fixation of the eye gaze and a regression of the eye gaze while reading the advance learning material.

6. The method of claim 1, further comprising, for each of the plurality of students, determining a difficulty level of the amount of additional learning material, wherein the difficulty level of the amount of additional learning material is based on the student comprehension score.

7. The method of claim 5, wherein the tracking the eye gaze comprises recording the eye gaze via the visual recording device coupled to the reading device of the student.

8. The method of claim 1, wherein a service provider at least one of creates, maintains, deploys and supports the computer device.

9. The method of claim 1, wherein the providing the current learning material and the advance learning material to the plurality of students and the monitoring the student's interactions with the advanced learning material are provided by a service provider on a subscription, advertising, and/or fee basis.

10. The method of claim 1, wherein the computer device includes software provided as a service in a cloud environment.

11. A computer program product, the computer program product comprising a computer readable storage medium having program instructions embodied therewith, the program instructions executable by a computing device to cause the computing device to:

provide advance learning material to be taught at future learning events to a plurality of students;

for each of the plurality of students:

monitor a student's interactions with the advanced learning material prior to a first learning event based on data from a reading device of the student, including data from a visual recording device, to determine portions of the advanced learning material pre-read by the student;

determine a reading performance of the student and a complexity of the portion of the advance learning material pre-read by the student based on the monitoring;

determine a student comprehension score for the student based on the reading performance and the complexity of the portion of the advance learning material pre-read by the student prior to the first learning event; and determine a difference in content between the portions of the advanced learning material pre-read by the student and current learning material of the advance learning material to be taught at the first learning event, the difference comprising available advanced learning material for the student;

provide the current learning material to each of the plurality of students during the first learning event; and selectively provide, to each respective student of the plurality of students during the first learning event, an amount of additional learning material from the available advanced learning material of the respective student to the reading device of the respective student based on the student comprehension score of the respective student.

12. The computer program product of claim 11, wherein the monitoring the student's interactions with the advanced learning material prior to the first learning event comprises monitoring a reading of the advance learning material on the reading device of the student, by the student, based on eye gaze information from the visual recording device.

13. The computer program product of claim 11, wherein the monitoring the student's interactions with the advanced learning material prior to the first learning event comprises at least one selected from the group consisting of:
   measuring an amount of time spent by the student in reading the advance learning material;
   measuring a success rate in solving one or more exercises and answering one or more questions included with the advance learning material;
   measuring an amount of the advance learning material that is read by the student;
   measuring one or more portions of the advance learning material that is not read by the student;
   tracking an eye gaze of the student during reading of the advance learning material; and
   monitoring a facial expression of the student during reading of the advance learning material.

14. The computer program product of claim 11, wherein a difficulty level of the amount of the additional learning material is based on the student comprehension score.

15. A system comprising:
   a processor, a computer readable memory, a computer readable storage medium, and program instructions stored on the computer readable storage medium, the program instructions executable to cause a computing device to:
   provide advance learning material to be taught at future learning events to a plurality of students; and
   for each of the plurality of students:
      monitor a student's interactions with the advanced learning material prior to a first learning event based on data from a reading device of the student, including data from a visual recording device to determine portions of the advanced learning material pre-read by the student;
      determine a reading performance of the student and a complexity of the portion of the advance learning material pre-read by the student based on the monitoring;
      determine a student comprehension score for the student based on the reading performance and the complexity of the portion of the advance learning material pre-read by the student; and
      determine a difference in content between the portions of the advanced learning material pre-read by the student and current learning material of the advance learning material to be taught at the first learning event, the difference comprising available advanced learning material for the student;
   provide, during the first learning event, the current learning material to each of the plurality of students; and
   selectively provide to each respective student of the plurality of students during the first learning event, an amount of additional learning material from the available advanced learning material of the respective student to the reading device of the respective student based on the student comprehension score of the respective student,
   wherein a difficulty level of the amount of additional learning material is based on the student comprehension score.

16. The system of claim 15, wherein monitoring the student's interactions with the advance learning material comprises monitoring a reading of the advance learning material on the reading device of the student.

17. The system of claim 16, wherein the monitoring the student's interactions with the advanced learning material prior to the first learning event comprises at least one selected from the group consisting of:
   measure an amount of time spent by the student in reading the advance learning material;
   measure a success rate in solving one or more exercises and answering one or more questions included with the advance learning material;
   measure an amount of the advance learning material that is read by the student;
   measure one or more portions of the advance learning material that is not read by the student;
   track an eye gaze of the student during reading of the advance learning material; and
   monitor a facial expression of the student during reading of the advance learning material.

18. The system of claim 15, wherein the current learning material, the advance learning material and the additional learning material are part of a same curriculum.

19. The system of claim 15, wherein the advance learning material comprises at least one selected from the group consisting of an advanced example and an extra credit question.

20. The method of claim 1, wherein the selectively providing the amount of additional learning material to the reading device of the student is further based on determining the student comprehension score is above a threshold.

* * * * *